United States Patent
Kitagawa et al.

(10) Patent No.: US 7,908,917 B2
(45) Date of Patent: Mar. 22, 2011

(54) DRIVING CONTROL METHOD OF TIRE TESTING MACHINE AND TIRE TESTING MACHINE

(75) Inventors: Mitsuhiro Kitagawa, Takasago (JP); Shiro Horiguchi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 88 days.

(21) Appl. No.: 12/492,722

(22) Filed: Jun. 26, 2009

(65) Prior Publication Data
US 2010/0037686 A1    Feb. 18, 2010

(30) Foreign Application Priority Data

Aug. 12, 2008  (JP) ................................. 2008-208164
Aug. 12, 2008  (JP) ................................. 2008-208165

(51) Int. Cl.
*G01M 17/02* (2006.01)
(52) U.S. Cl. ........................................................ 73/146
(58) Field of Classification Search .................. None
See application file for complete search history.

(56) References Cited

U.S. PATENT DOCUMENTS

| | | | |
|---|---|---|---|
| 5,811,672 A * | 9/1998 | Mancosu et al. | 73/146 |
| 6,269,690 B1 * | 8/2001 | Shimizu et al. | 73/146 |
| 6,584,835 B2 | 7/2003 | Jenniges et al. | |
| 2002/0083762 A1 * | 7/2002 | Coe et al. | 73/146 |
| 2003/0037608 A1 * | 2/2003 | Crema et al. | 73/146 |
| 2007/0256484 A1 * | 11/2007 | Imanishi et al. | 73/146 |
| 2009/0000371 A1 * | 1/2009 | Hanada | 73/146 |
| 2009/0301192 A1 * | 12/2009 | Douglas et al. | 73/460 |
| 2010/0031740 A1 * | 2/2010 | Olex et al. | 73/146 |
| 2010/0083745 A1 * | 4/2010 | Schleif et al. | 73/146 |

* cited by examiner

*Primary Examiner* — Andre J Allen
(74) *Attorney, Agent, or Firm* — Oblon, Spivak, McClelland, Maier & Neustadt, L.L.P.

(57) ABSTRACT

The present invention is a driving control method of a tire testing machine provided with a controller for giving a rotation command to a tire driving electric motor so that a slippage ratio of a tire with respect to movement of a simulated road surface is a preliminarily fixed value, and changing rotation speed of the tire, the method comprising: estimating longitudinal force imposed on the tire in accordance with the slippage ratio of the tire in a case where the rotation command is given; determining a torque limitation value for the tire driving electric motor based on an estimated longitudinal force estimate value; and applying the torque limitation value to torque limitation of the tire driving electric motor when the rotation command is given so as to change the rotation speed of the tire. With such a configuration, in a case where a tire test is performed while changing the slippage ratio, it is possible to perform the test without imposing excessive overloads on the tire driving electric motor.

6 Claims, 5 Drawing Sheets

DRIVING CONTROL METHOD OF TIRE TESTING MACHINE AND TIRE TESTING MACHINE

BACKGROUND OF THE INVENTION

1. Field of the Invention

The present invention relates to a driving control method of a tire testing machine for performing a test while changing a slippage ratio of a tire with respect to a simulated road surface and a tire testing machine.

2. Description of the Related Art

Conventionally, there is a tire testing machine capable of rotating a tire shaft (a spindle shaft) to which a tire is installed by a tire driving electric motor and also rotating a drive drum having a simulated road surface with which the tire is brought into contact by an electric motor for the simulated road surface which is different from the tire driving electric motor described in U.S. Pat. No. 6,584,835.

In this tire testing machine, since the rotation number of the tire (speed of the tire) is differentiated from the rotation number of the drive drum (speed of the drive drum) in a state that the tire is in contact with the simulated road surface, it is possible to perform various tests of the tire while allowing the tire to slip on the simulated road surface.

In the test, by adjusting a difference between the speed of the tire and the speed of the drive drum, it is possible to change a degree of slippage of the tire with respect to the simulated road surface, that is, a slippage ratio.

However, at the time of adjusting the speed of the tire and the speed of the drive drum so that the slippage ratio is a desired value (at the time of change in the slippage ratio), when a surface state of the tire (a state of a tread), a contacting situation of the tire with respect to the simulated road surface or the like is changed, there is sometimes a case where an abnormal load change is given to the tire driving electric motor on the side of rotating the tire. According to circumstances, there is a fear that stick slip is caused and excessive loads are imposed on the tire testing machine.

SUMMARY OF THE INVENTION

In consideration to the above problems, it is an object of the present invention to provide a driving control method of a tire testing machine capable of performing a test with a slippage ratio as wide as possible without imposing excessive overloads on a tire driving electric motor in a case where the test of a tire is performed while changing the slippage ratio, and a tire testing machine.

In order to achieve the above object, the present invention has the following means. That is, the present invention is a driving control method of a tire testing machine, the tire testing machine, including: a tire driving electric motor for rotating a tire via a tire shaft; a simulated road surface driving electric motor for moving a simulated road surface; and a controller for giving a rotation command to the tire driving electric motor so that a slippage ratio of the tire with respect to the movement of the simulated road surface is a preliminarily fixed value, and changing rotation speed of the tire, the method comprising: estimating longitudinal force imposed on the tire in accordance with the slippage ratio of the tire in a case where the rotation command is given; determining a torque limitation value for the tire driving electric motor based on an estimated longitudinal force estimate value; and applying the torque limitation value to torque limitation of the tire driving electric motor when the rotation command is given so as to change the rotation speed of the tire.

Preferably, the torque limitation value is determined by an equation (1):

[Torque limitation value]=[Longitudinal force estimate value]×[Tire running radius]   (1)

wherein

[Longitudinal force estimate value]=[Internal coefficient]×[Load]×[Slippage ratio]

wherein the tire running radius: a distance from the simulated road surface to a wheel center of the tire;

the internal coefficient: a coefficient differentiated by a testing condition; and the load: a vertical load of the tire to the simulated road surface.

Preferably, when the rotation command is given and braking force or drive force is imposed on the tire driving electric motor so as to rotate the tire, determining torque working on to the simulated road surface driving electric motor as external force from the tire side; and adding the torque corresponding to the external force to output torque of the simulated road surface driving electric motor.

Preferably, the simulated road surface is provided so as to be moved by a drive drum driven by the simulated road surface driving electric motor, and the torque added to the simulated road surface driving electric motor is determined by equations (2) to (4):

$$Td = \frac{Tn}{TH} \times DR \quad (2)$$

$$Tdm = \frac{Td}{Gr} \quad (3)$$

$$FF = \alpha \times Tdm \quad (4)$$

wherein

Td: torque working on a rotation shaft of the drive drum by braking force or drive force on the tire driving electric motor as the external force;

Tn: generated torque of the tire driving electric motor;

TH: the tire running radius;

DR: a distance determined by adding thickness of the simulated road surface to a rotation radius of the drive drum;

Tdm: torque working on a rotation shaft of the simulated road surface driving electric motor by the braking force or the drive force on the tire driving electric motor as the external force;

Gr: a gear reduction ratio of a reducer connected to the simulated road surface driving electric motor;

FF: the torque added to the simulated road surface driving electric motor; and

α: a correction coefficient.

Other technical means of the present invention is a tire testing machine, comprising a tire driving electric motor for rotating a tire shaft, a simulated road surface, a simulated road surface driving electric motor for moving the simulated road surface, and a controller for giving a rotation command to the tire driving electric motor so that a slippage ratio of a tire with respect to movement of the simulated road surface is a preliminarily set target value, and changing rotation speed of the tire. The controller includes a rotation command value calculating portion for determining the rotation command given to the tire driving electric motor so as to change the rotation speed of the tire in accordance with the slippage ratio, a longitudinal force estimating portion for estimating longitudinal force imposed on the tire in a case where the rotation command is given, a torque limitation value setting portion for setting a torque limitation value for the tire driving electric motor based on the estimated longitudinal force, and a torque limiting portion for applying the torque limitation value when the rotation command is given so as to change the rotation number of the tire driving electric motor and putting torque limitation on the tire driving electric motor.

Preferably, the controller further includes a working torque calculating portion for determining torque working on to the simulated road surface driving electric motor as external force from the tire side in a case where the rotation command is given and braking force or drive force is imposed on the tire driving electric motor so as to rotate the tire, and a torque adding portion for adding the torque corresponding to the external force calculated by the working torque calculating portion to output torque of the simulated road surface driving electric motor.

According to the present invention, it is possible to perform the test with a slippage ratio as wide as possible without imposing excessive overloads on the tire driving electric motor in a case where the test of the tire is performed while changing the slippage ratio.

BRIEF DESCRIPTION OF THE DRAWINGS

FIG. 2 is an explanatory view of a slippage ratio setting operation.

DESCRIPTION OF THE PREFERRED EMBODIMENTS

Hereinafter, a description will be given to embodiments of the present invention with reference to the drawings.

First Embodiment

Figure 1:
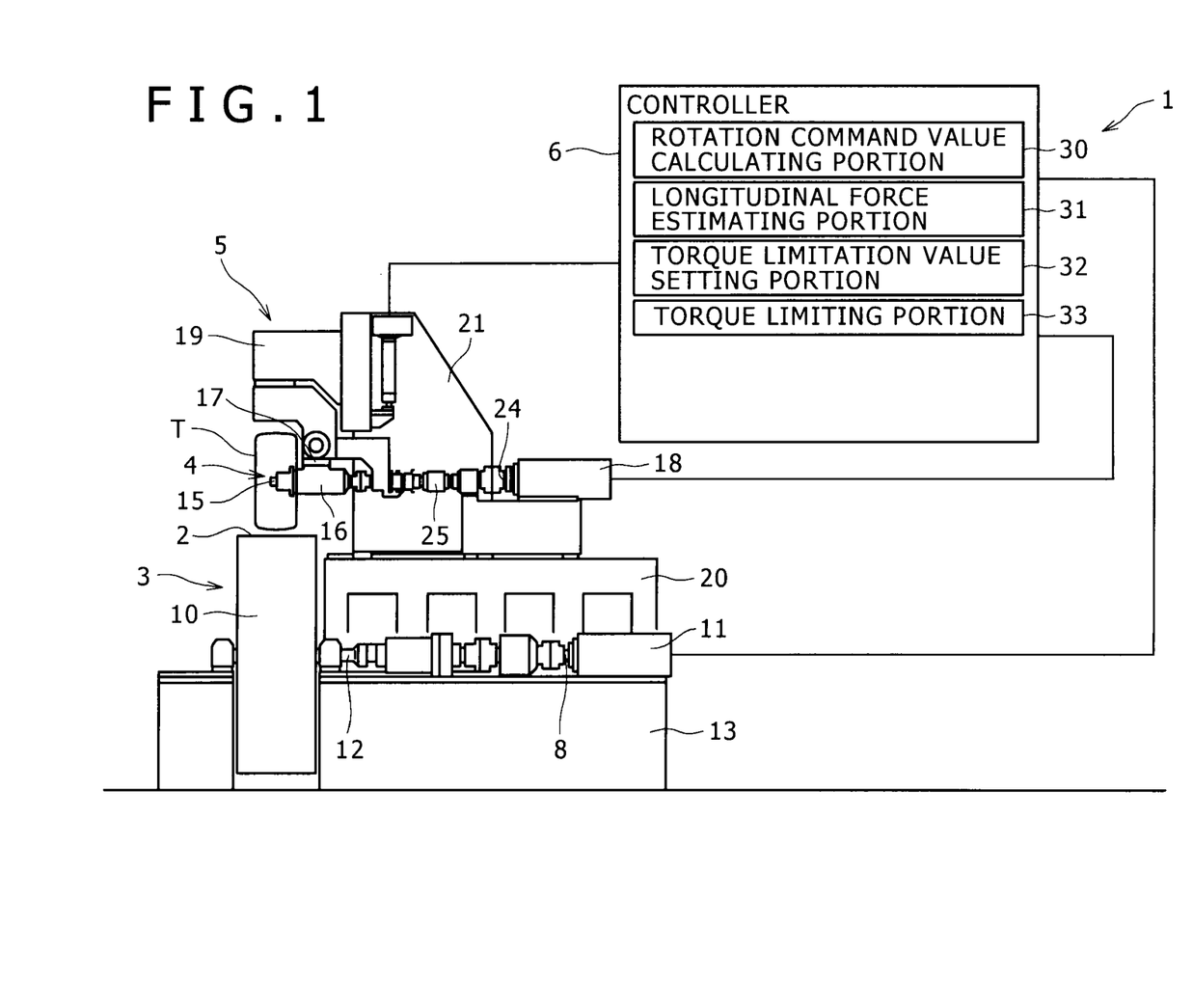
FIG. 1 is an entire front view of a tire testing machine of a first embodiment.

FIG. 1 shows a tire testing machine.

FIG. 1 shows an entire configuration of the tire testing machine. In the following description, the up and down direction on a paper of FIG. 1 indicates the up and down direction or the vertical direction, the left and right direction on the paper of FIG. 1 indicates the left and right direction, and the penetrating direction on the paper of FIG. 1 indicates the longitudinal direction.

As shown in FIG. 1, a tire testing machine 1 is provided with a road surface moving mechanism 3 for moving a simulated road surface 2, a tire retaining mechanism 4 for rotatably retaining a tire T, a moving mechanism 5 for pressing the tire T onto the simulated road surface 2 and giving a slippage angle and a camber angle, and a controller 6 for controlling the tire retaining mechanism 4, the road surface moving mechanism 3 and the moving mechanism 5.

The road surface moving mechanism 3 is provided with a cylindrical drive drum 10, and a simulated road surface driving electric motor 11 for diving this drive drum 10 to rotate. The drive drum 10 is arranged below the tire retaining mechanism 4, and the simulated road surface 2 is formed on an outer peripheral surface of the drive drum 10. A rotation shaft 12 of the drive drum 10 is rotatably supported on a first support base 13. The simulated road surface driving electric motor 11 is arranged to the right side of the drive drum 10 (to the right side in FIG. 1) and fixed to the first support base 13. A rotation shaft 8 of the simulated road surface driving electric motor 11 and the rotation shaft 12 of the drive drum 10 are coupled to each other via a drive shaft so as to integrally rotate.

The tire retaining mechanism 4 is arranged above the road surface moving mechanism 3 and provided with a tire shaft (a spindle shaft) 15 for retaining the tire T via a rim (not shown), a housing 16 for rotatably supporting the tire shaft 15, a six component force transducer (a load cell) 17 for measuring a load and moment of the tire T via the housing 16, and a tire driving electric motor 18 for rotating the tire shaft 15.

The housing 16 and the load cell 17 are provided for a lower part of a raising and lowering frame 19 of the moving mechanism 5 which can be raised and lowered. This raising and lowering frame 19 is supported by a support frame 21 provided for a third support base 20. The tire driving electric motor 18 is provided for a fourth support base arranged to the right side of the third support base 20.

The tire shaft 15 (the spindle shaft) and a rotation shaft 24 of the tire driving electric motor 18 are coupled to each other via the drive shaft 25 and free joints provided on the both sides thereof so as to be integrally rotatable.

When a tire test is performed in the above tire testing machine 1, firstly, the tire T is installed to the tire shaft 15 via the rim and then the raising and lowering frame 19 of the moving mechanism 5 is lowered so as to bring the tire T into contact with the simulated road surface 2. In a state that the tire T is in contact with the simulated road surface 2, the simulated road surface driving electric motor 11 is driven so as to rotate the drive drum 10 and also the tire driving electric motor 18 is driven so as to rotate the tire shaft 15. Thereby, it is possible to perform various tests while allowing the tire T to slip with respect to movement of the simulated road surface 2.

Hereinafter, a detailed description will be given to a tire testing method of performing the test while allowing the tire T to slip and a driving control method at the time of this tire test, and also a configuration of the controller 6.

In the tire test, firstly, testing conditions for the tire T, for example, air pressure of the tire T, load imposed on the tire T against the simulated road surface 2, simulated road surface moving speed and the like, are the same conditions (values) between before and after slippage.

Then, in this tire test, a slippage ratio Sr of the tire T with respect to the movement of the simulated road surface 2 is set as described later. And while allowing the tire T to slip at the set slippage ratio Sr, various tests are performed, for example, when the camber angle and the slippage angle of the tire T are changed, a load imposed on the tire T is measured by the load cell 17; and when the slippage ratio Sr is successively changed, a state of the tread of the tire T or the like is observed. It should be noted that since the present invention can be applied to all the tests which are performed while changing the slippage ratio Sr, modes of various tests after changing the slippage ratio Sr are not limited to the mode described above.

In a slippage operation for setting and changing the slippage ratio Sr (sometimes called as a slippage ratio setting operation), first of all, in a state that the tire T is pressed onto the drive drum 10 with a predetermined load (in a state that the tire T is brought into contact with the simulated road surface 2), the tire shaft 15 is rotated with torque zero. That is, in the slippage ratio setting operation, firstly, after bringing the tire T into contact with the simulated road surface 2, the tire driving electric motor 18 is not driven but only the simulated road surface driving electric motor 11 is driven. Thereby, the tire T is rotated by the movement of simulated road surface.

In this passive rotation state, the tire T is rotated only by the movement of the simulated road surface 2. Therefore, the tire T is not slipped with respect to the simulated road surface 2 and the slippage ratio Sr is zero.

The simulated road surface moving speed (the drive drum rotation number) ωdz and tire rotation speed (the tire rotation number) ωtz in the passive rotation state (when the slippage ratio Sr is zero) are measured by a sensor or the like.

Next, in the slippage ratio setting operation, the rotation number of the tire driving electric motor 18 is changed so as to change the tire rotation speed. Thereby, the tire T is intentionally slipped on the simulated road surface 2.

Then, when the tire rotation speed is changed so as to allow the tire T to slip in the slippage ratio setting operation, if the simulated road surface moving speed is constant, the slippage ratio Sr of the tire T is determined by tire rotation speed ωt at the time of change (at the present) and the tire rotation speed ωtz when the slippage ratio is zero as shown by an equation (5).

$$Sr = \frac{\omega t - \omega tz}{\omega tz} \quad (5)$$

Sr: the slippage ratio
ωt: the present tire rotation speed (at the time of change) (the rotation number of the tire)
ωtz: the tire rotation speed when the slippage ratio is zero (the rotation number of the tire)

However, in the slippage ratio setting operation, force of the tire at the time of change in the tire rotation speed is added to the simulated road surface driving electric motor 11 via the simulated road surface 2. The rotation number of the simulated road surface driving electric motor 11 is changed by this external force. In accordance with the change in the tire rotation speed, the simulated road surface moving speed is changed in fact.

Therefore, in the slippage ratio setting operation according to the present invention, as shown by an equation (6), tire rotation speed ωtz' in accordance with the change in the simulated road surface moving speed ωdz is calculated from the tire rotation speed ωtz when the slippage ratio Sr is zero, present simulated road surface moving speed (the simulated road surface moving speed at the time of change) ωd, and the simulated road surface moving speed ωdz when the slippage ratio Sr is zero, and the simulated road surface moving speed in accordance with the change in the tire rotation speed is added by an equation (7) to correct the slippage ratio Sr to be set.

$$Sr = \frac{\omega t - \omega tz'}{\omega tz'} \quad (6)$$

$$\omega tz' = \omega tz \cdot \frac{\omega d}{\omega dz} \quad (7)$$

wherein
Sr: the slippage ratio
ωt: the present tire rotation speed (at the time of change) (the rotation number of the tire)
ωd: the present simulated road surface moving speed (at the time of change) (the rotation number of the drive drum)
ωtz: the tire rotation speed when the slippage ratio is zero (the rotation number of the tire)
ωdz: the simulated road surface moving speed when the slippage ratio is zero (the rotation number of the drive drum)
ωtz': the tire rotation speed corresponding to the slippage ratio of zero determined from the present simulated road surface moving speed (at the time of change)

Thus, in the slippage ratio setting operation of the present invention, a rotation command is given from the controller 6 to the tire driving electric motor 18 so that the slippage ratio Sr determined by the equation (6) is a target value used in the tire test (a preliminarily set value), and hence the tire rotation speed is increased or decreased.

In such a way, in the slippage ratio setting operation, the tire test is performed by properly setting the slippage ratio Sr. When this slippage ratio setting operation is examined further in detail, the slippage ratio setting operation includes three operations of a Sweep operation, a Step operation and a fixing operation as shown in FIG. 2. As mentioned above, the Sweep operation, the Step operation and the fixing operation are common in a point of setting the slippage ratio Sr. However, a degree of changing the slippage ratio Sr within a predetermined time (in one step) is different in each of the operations.

Figure 2A:
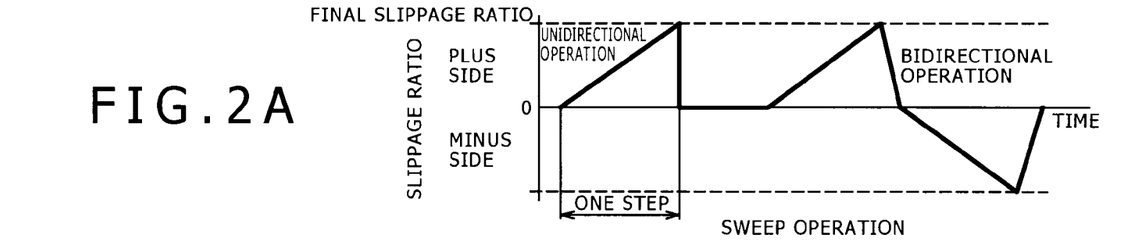
FIG. 2(a) shows a Sweep operation.
Figure 2B:
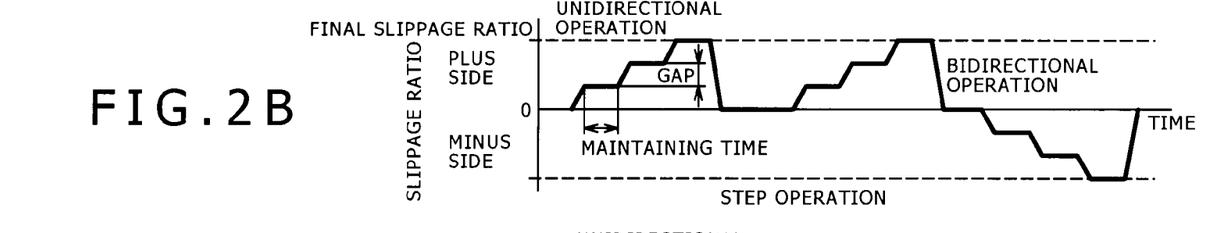
FIG. 2(b) shows a Step operation.
Figure 2C:
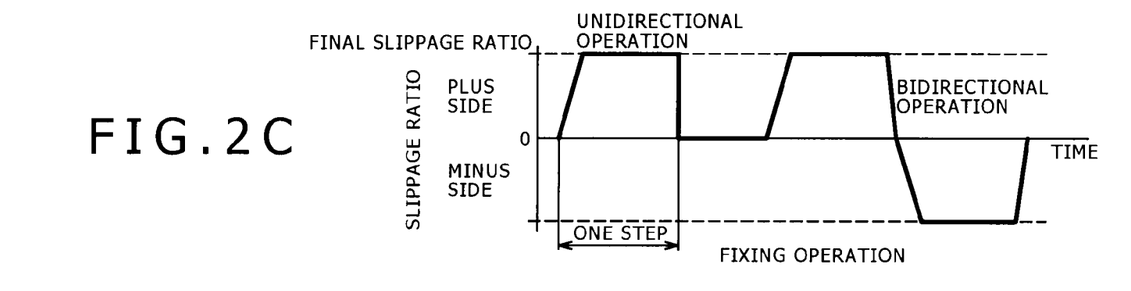
FIG. 2(c) shows a fixing operation.

As shown in FIG. 2(a), the Sweep operation is an operation of gradually increasing and decreasing the slippage ratio Sr within the predetermined time (in one step) until the slippage ratio Sr is a final slippage ratio set in one step. As shown in FIG. 2(b), the Step operation is an operation of stepwise increasing and decreasing the slippage ratio Sr within the predetermined time (in one step) until the slippage ratio Sr is the final slippage ratio and also maintaining the slippage ratio which is once increased or decreased for a fixed time. As shown in FIG. 2(c), the fixing operation is an operation of increasing or decreasing the slippage ratio to the final slippage ratio at once within the predetermined time (in one step) and then maintaining the final slippage ratio until the operation is to be finished.

The Sweep operation, the Step operation and the fixing operation further include a unidirectional operation and a bidirectional operation.

Here, on a basis of the slippage ratio of zero with which the tire T is not slipped with respect to the simulated road surface 2, the slippage ratio Sr when the tire rotation speed is increased is the plus side, and the slippage ratio Sr when the tire rotation speed is decreased is the minus side. The unidirectional operation is an operation of only increasing or decreasing the tire rotation speed so as to change the slippage ratio Sr to one of the plus side and the minus side. The bidirectional operation is an operation of both increasing and decreasing the tire rotation speed so as to change the slippage ratio Sr to both the plus side and the minus side.

Therefore, when the test is performed while the tire T is slipped, tests of the Sweep operation, the Step operation and the fixing operation are performed and also tests are performed while changing the slippage ratio Sr by the unidirectional operation and the bidirectional operation in each of the Sweep operation, the Step operation and the fixing operation.

When the target value of the slippage ratio Sr is changed in the Sweep operation, the Step operation and the fixing operation, longitudinal force imposed on the tire is estimated in accordance with the target value every time when the slippage ratio is changed.

Specifically, as mentioned above, when the rotation command is given from the controller 6 to the tire driving electric motor 18 corresponding to the tire rotation speed so that the slippage ratio is the target value, the longitudinal force imposed on the tire T is estimated in accordance with the target value of the slippage ratio. An estimate value of the longitudinal force imposed on this tire T is determined by an equation (8).

[Longitudinal force estimate value]=[Internal coefficient]×[Load]×[Slippage ratio]  (8)

the internal coefficient: a coefficient differentiated by a testing condition
the load: a vertical load of the tire to the simulated road surface The equation (8) is determined by an experiment and the like. The internal coefficient is differentiated by a type of the tire T or the like, and the coefficient is within a range from 0.2 to 0.3, preferably 0.25 in a PC tire T (a tire T for a passenger automobile), and within a range from 0.08 to 0.2, preferably 0.12 in a TB tire T (for a truck and a bus). The more the tire T is enlarged, the less the internal coefficient is. The internal coefficient is set within a range from 0.3 to 0.08 according to the testing condition. The load can be determined from a measurement value of the load cell 17, a load imposed on a supporting part of a drum shaft, or pressure of a drive cylinder for raising and lowering the raising and lowering frame for example.

Based on the longitudinal force estimate value determined by the equation (8), a torque limitation value for the tire driving electric motor 18 is determined by an equation (1).

[Torque limitation value]=[Longitudinal force estimate value]×[Tire running radius]  (1)

wherein
the tire running radius: a distance from the simulated road surface to a wheel center of the tire The tire running radius is the distance from the simulated road surface to the wheel center of the tire as shown by the equation (1). However, since it is difficult to actually measure a tire running radius Tr in the tire test, the tire running radius Tr is determined by an equation (9) in this embodiment.

$$Tr = DR \cdot \frac{\omega dz}{\omega tz} \quad (9)$$

wherein
Tr: the tire running radius
DR: a distance determined by adding thickness of the simulated road surface to a rotation radius of the drive drum In the slippage ratio setting operation, an upper limit value of output torque of the tire driving electric motor 18 when the tire rotation speed is changed by the tire driving electric motor 18 is the torque limitation value determined by the equation (1).

As mentioned above, in the present invention, when the tire rotation speed is changed by the tire driving electric motor 18 so that the slippage ratio Sr is the target value, torque of the tire driving electric motor 18 does not exceed the torque limitation value determined by the equation (1).

The controller 6 is provided with a rotation command value calculating portion 30, a longitudinal force estimating portion 31, a torque limitation value setting portion 32, and a first torque limiting portion 33.

The rotation command value calculating portion 30 determines the rotation command given to the tire driving electric motor 18 so that the slippage ratio Sr is the set target value. In detail, when the target slippage ratio Sr is given at the time of the tire test, the rotation command value calculating portion 30 determines the tire rotation speed ωt to be changed using the equations (5) and (6) so that the slippage ratio is the target value and decides the rotation number of the tire driving electric motor 18 for achieving the tire rotation speed ωt.

Figure 3:
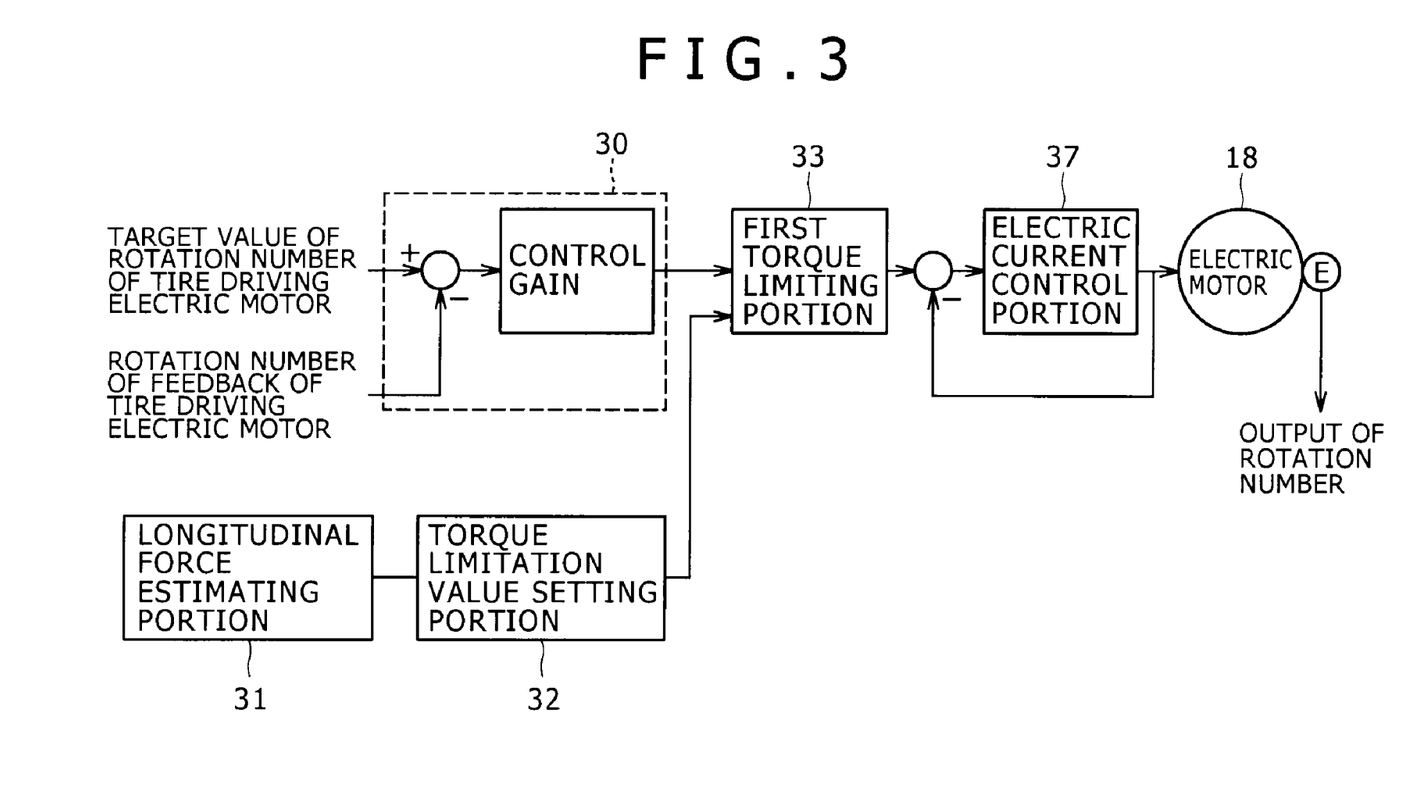
FIG. 3 shows a control loop of a tire driving electric motor.

In detail, as shown in FIG. 3, the rotation command value calculating portion 30 determines the rotation command value by multiplying a difference between the present rotation number of the tire driving electric motor 18 (the tire rotation speed) and a target value of the rotation number of the tire driving electric motor 18 based on the tire rotation speed determined by the target slippage ratio Sr by gain. The rotation command value calculating portion 30 outputs the determined rotation command value to the first torque limiting portion 33.

The longitudinal force estimating portion 31 estimates the longitudinal force imposed on the tire T based on the target value of the slippage ratio Sr. When the slippage ratio Sr is given, the longitudinal force estimating portion 31 determines the longitudinal force of the tire T by the equation (8) with using the above slippage ratio Sr.

The torque limitation value setting portion 32 determines the torque limitation value for the tire driving electric motor 18 by the equation (1) based on the longitudinal force estimated by the longitudinal force estimating portion 31, and outputs the torque limitation value to the first torque limiting portion 33.

When the rotation number of the tire driving electric motor 18 is changed by the rotation command, the first torque limiting portion 33 takes the torque limitation value determined by the torque limitation value setting portion 32 as torque limitation in the rotation command for the tire driving electric motor 18, and limits the output torque of the tire driving electric motor 18.

That is, when the rotation command for the tire driving electric motor 18 is given based on the rotation command value from the rotation command value calculating portion 30, the first torque limiting portion 33 firstly determines whether or not the output torque of the tire driving electric motor 18 when the tire driving electric motor 18 is driven by this rotation command exceeds the torque limitation value. Then, in a case where the output torque does not exceed the torque limitation value, the first torque limiting portion 33 drives the tire driving electric motor 18 based on the rotation command value given from the rotation command value calculating portion 30 via an electric current control portion 37. In a case where the output torque exceeds the torque limitation value, the first torque limiting portion 33 rotates the tire driving electric motor 18 with the torque of the torque limitation value.

According to the tire testing machine 1 of the present invention, in a case where the rotation command is given due to the change in the slippage ratio, the longitudinal force imposed on the tire in accordance with the slippage ratio is estimated, the torque limitation value for the tire driving electric motor 18 is determined based on the estimated longitudinal estimate value, and the torque limitation value is applied to the torque limitation of the tire driving electric motor 18 when the rotation command is given so as to change the rotation speed of the tire. Therefore, it is possible to perform the test with a slippage ratio as wide as possible without imposing excessive overloads on the tire driving electric motor 18. That is, in the present invention, the torque limitation value for the tire driving electric motor 18 is obtained from the longitudinal force imposed on the tire when the slippage ratio is changed. Therefore, it is possible to set the slippage ratio nearly to limitation which is permitted according to a performance of the tire driving electric motor 18. Consequently, it is possible to extend a changing range of the slippage ratio.

Second Embodiment

Figure 4:
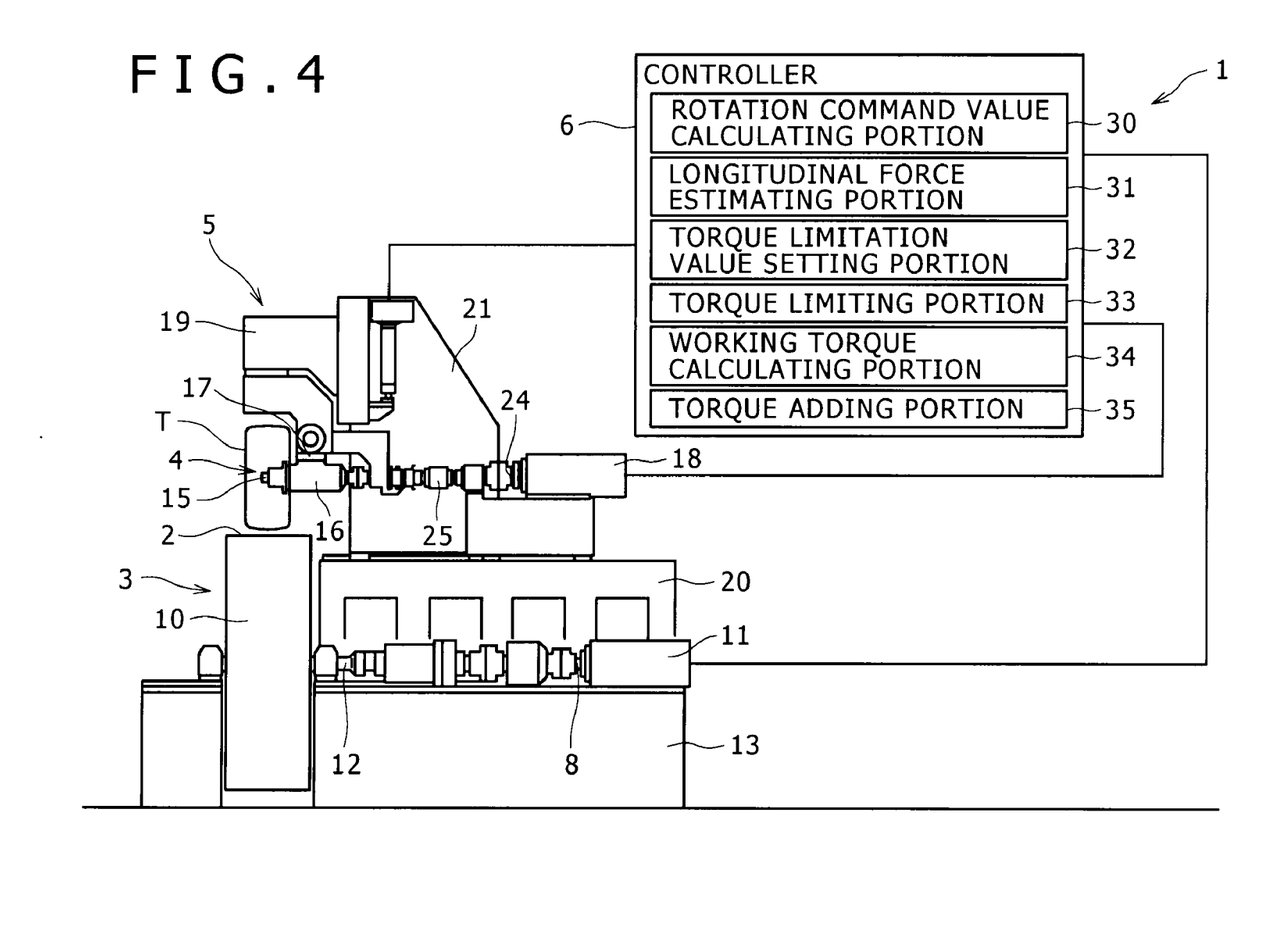
FIG. 4 is an entire front view of a tire testing machine of a second embodiment.
Figure 5:
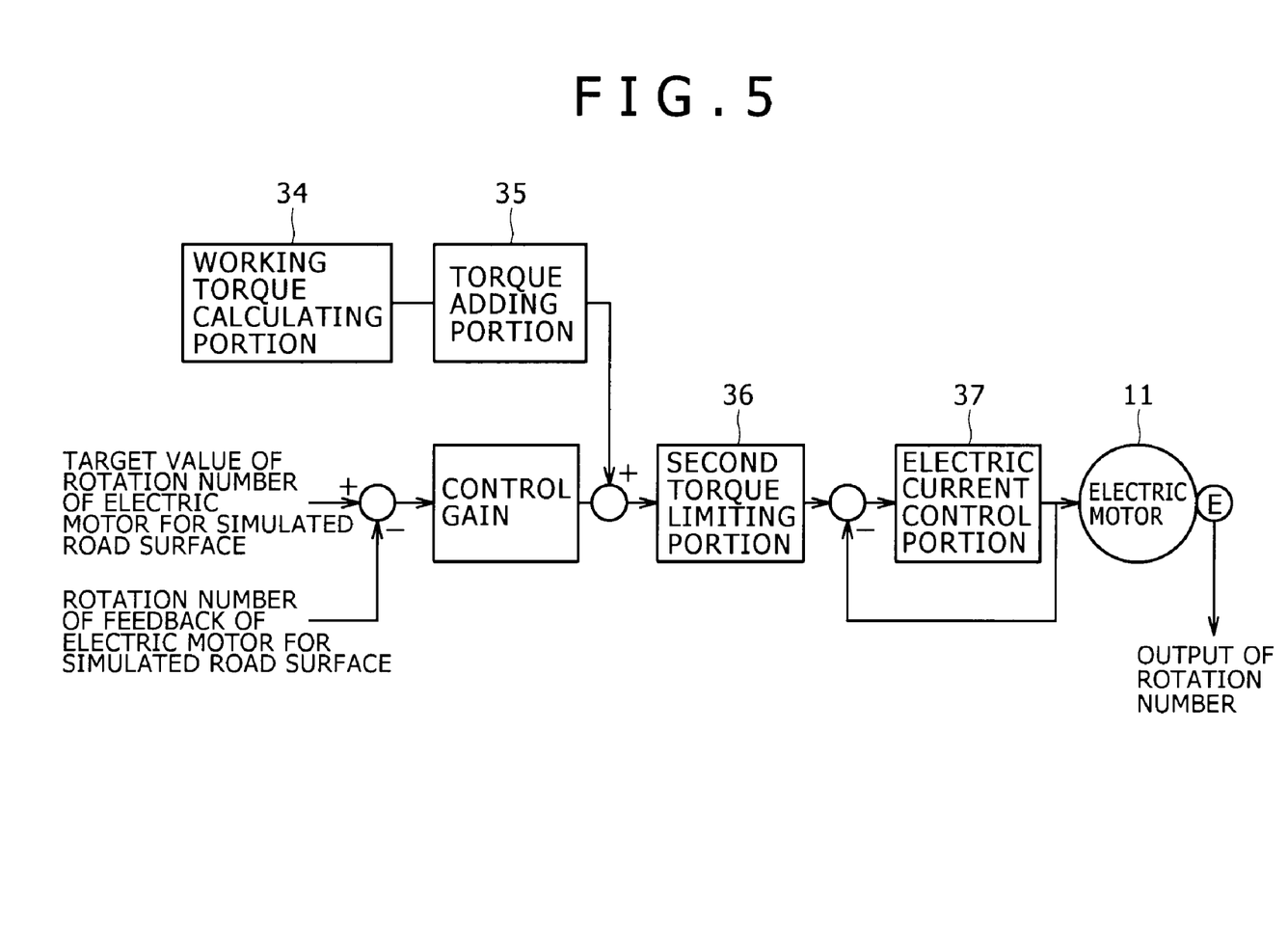
FIG. 5 shows a control loop of a simulated road surface driving electric motor.

FIGS. 4 and 5 show the tire testing machine 1 in a second embodiment.

The controller 6 in this tire testing machine 1 is provided with a working torque calculating portion 34 and a torque adding portion 35 in addition to the rotation command value calculating portion 30, the longitudinal force estimating portion 31, and the first torque limiting portion 33.

This working torque calculating portion 34 determines torque working on to the simulated road surface driving electric motor as external force from the tire side in a case where the rotation command is given and braking force or drive force is imposed on the tire driving electric motor 18 so as to rotate the tire (sometimes called as working torque). In other words, the working torque calculating portion 34 determines the working torque working on the side of the simulated road surface driving electric motor 11 when the slippage ratio Sr is the target value and the tire driving electric motor 18 is rotated so that the slippage ratio is the target slippage ratio. Specifically, when the tire T is rotated with the predetermined slippage ratio Sr, the working torque calculating portion 34 determines torque (working torque) Tdm working on the side of the simulated road surface driving electric motor 11 at the time of slippage with using generated torque Tn generated in the tire driving electric motor 18 as shown by equations (2) and (3).

$$Td = \frac{Tn}{TH} \times DR \quad (2)$$

$$Tdm = \frac{Td}{Gr} \quad (3)$$

$$FF = \alpha \times Tdm \quad (4)$$

wherein
Td: the torque working on the rotation shaft of the drive drum by the braking force or the drive force of the tire driving electric motor as the external force
Tn: the generated torque of the tire driving electric motor
TH: the tire running radius
DR: the distance determined by adding the thickness of the simulated road surface to the rotation radius of the drive drum
Tdm: torque working on the rotation shaft of the simulated road surface driving electric motor by the braking force or the drive force of the tire driving electric motor as the external force
Gr: a gear reduction ratio of a reducer connected to the simulated road surface driving electric motor
FF: torque added to the simulated road surface driving electric motor
α: a correction coefficient Gr is the reduction ratio of the reducer connected to the simulated road surface driving electric motor 11.

The torque adding portion 35 adds the working torque corresponding to the external force calculated by the working torque calculating portion 34 to output torque of the simulated road surface driving electric motor 11 through feedforward or feedback. The torque adding portion 35 multiplies the working torque Tdm calculated by the working torque calculating portion 34 by the correction coefficient as shown by the equation (4), and adds the working torque (FF) corrected by the correction coefficient to the output torque of the simulated road surface driving electric motor 11 as a feedforward component. It should be noted that the correction coefficient is within a range from 0.95 to 1.05. In this embodiment, the correction coefficient is 1.0 and Tdm=FF.

In detail, as shown in FIG. 5, when the simulated road surface driving electric motor 11 is driven, the controller 6 determines a rotation command value by multiplying a difference between the present rotation number of the simulated road surface driving electric motor 11 and a target value of the rotation number of the simulated road surface driving electric motor 11 for making the simulated road surface moving speed to be constant by control gain. At this time, the working torque FF after correction calculated by the working torque calculating portion 34 is added to output torque corresponding to the rotation command value for the simulated road surface driving electric motor 11 by the torque adding portion 35 of the controller 6. That is, the working torque FF after the correction corresponding to the external force calculated by the working torque calculating portion 34 is added to the output torque of the simulated road surface driving electric motor 11 by the torque adding portion 35 through the feedforward. It should be noted that the working torque FF may be added to the output torque of the simulated road surface driving electric motor 11 through the feedback.

The controller 6 also has a second torque limiting portion 36 for limiting the torque of the simulated road surface driving electric motor 11. The second torque limiting portion 36 determines whether or not the output torque of the simulated road surface driving electric motor 11 exceeds a torque limitation value for the simulated road surface driving electric motor 11 (that is, a torque limitation value of the simulated road surface driving electric motor 11 itself), and limits the output torque. It should be noted that the simulated road surface driving electric motor 11 is driven based on the rotation command given from the controller 6 via the electric current control portion 37.

In the tire testing machine 1 of the second embodiment, at the time of driving the simulated road surface driving electric motor 11 together with driving of the tire driving electric motor 18, when the tire shaft 15 is rotated by driving the tire driving electric motor 18, the working torque corresponding to the external force from the tire side to the simulated road surface driving electric motor 11 is determined by the working torque calculating portion 34, and the determined working torque FF is added to the output torque corresponding to the rotation command value by the torque adding portion 35.

According to the second embodiment, when the tire rotation speed is changed by driving the tire driving electric motor 18, the working torque FF is preliminarily given to the simulated road surface driving electric motor 11. Therefore, even when the slippage ratio Sr is changed, the rotation number of the drive drum 10 (the simulated road surface moving speed) is hardly changed so as to be constant. In other words, in the slippage ratio setting operation, even when the external force from the tire side is imposed on the side of the simulated road surface 2 of the drive drum 10 in according with the change in the slippage ratio Sr (the change in the drive force of the tire driving electric motor 18), the simulated road surface moving speed is not changed as the working torque corresponding to the above external force is added to the simulated road surface driving electric motor 11. That is, while maintaining a condition of the simulated road surface moving speed to be constant, a relationship between the slippage ratio Sr and an amount of an object to be measured can be measured. Therefore, it is possible to improve measurement accuracy of the relationship between the slippage ratio Sr and the amount of the object to be measured.

When an operation of imposing the braking force or the drive force on the side of the tire driving electric motor 18, that is, a braking or driving operation is finished and the tire T is returned to a state before the operation of imposing the braking force or the drive force, the torque (the external force) working from the tire T side (the side of the tire driving electric motor 18) onto the side of the simulated road surface 2 of the drive drum 10 is suddenly eliminated. In this embodiment, as the working torque FF is added, when the torque Tn on the side of the tire driving electric motor 18 is zero, the working torque FF added to the simulated road surface driving electric motor 11 is immediately zero. Thus, at the same time as finishing the braking or driving operation of the tire driving electric motor 18, the simulated road surface driving electric motor 11 is switched to control for only making the rotation number of the drive drum 10 (the simulated road surface moving speed) to be constant. As a result, even when the tire driving electric motor 18 finishes the braking or driving operation, the simulated road surface moving speed is hardly changed.

Therefore, since the simulated road surface moving speed is less changed even immediately after the tire driving electric motor 18 finishes the braking or driving operation, it is possible to maintain this state and perform the braking or driving operation of the tire driving electric motor 18 again so as to immediately perform a new tire test. That is, since the speed of the drive drum 10 can be maintained to be constant even after finishing the tire test, it is possible to perform the next tire test straight away.

Third Embodiment

In a third embodiment, a description will be given to a longitudinal force test of measuring force in the Xw axial direction of an ISO8855 coordinate system while changing the longitudinal force (tangential force) of the tire with respect to the simulated road surface. The test performed by driving both the tire driving electric motor 18 and the simulated road surface driving electric motor 11 includes the longitudinal force test in addition to the slippage test described in the first and second embodiments.

In the longitudinal force test as well, first of all, in a state that the tire T is pressed onto the drum with a predetermined load (in a state that the tire T is brought into contact with the simulated road surface 2), the tire is rotated by the movement of the simulated road surface. That is, the tire is rotated in a state that the slippage ratio is zero.

Then, longitudinal force $Fx_0$ of the tire with respect to the simulated road surface in a state that the slippage ratio is zero is measured by the load cell. As shown by an equation (10), output torque Tq of the tire driving electric motor 18 is calculated by this longitudinal force $Fx_0$ of the tire and the tire running radius TH so that the longitudinal force of the tire is a preliminarily set target value Fx, and the tire driving electric motor 18 is driven with the output torque Tq.

$$Tq = (Fx \pm Fx_0) \times TH \tag{10}$$

wherein
Tq: the output torque of the tire driving electric motor
Fx: the present longitudinal force of the tire (at the time of change)
$Fx_0$: the longitudinal force of the tire when the slippage ratio is zero In such a way, at the time of driving the tire driving electric motor 18, when the tire T is rotated with the predetermined torque Tq, the working torque calculating portion 34 determines the working torque Tdm working from the tire side onto the side of the simulated road surface driving electric motor with using the generated torque Tn (Tn=Tq) generated in this driving electric motor. The torque adding portion 35 adds the working torque corresponding to the external force calculated by the working torque calculating portion 34 to the output torque of the simulated road surface driving electric motor 11 as the feedforward component.

It should be noted that in a case of the TB tire (the tire for the truck and the bus), since a vertical load imposed on the tire is large in comparison to the PC tire (the tire for the passenger automobile) and a LT tire (a tire for a small truck), the test is sometimes performed under a high load condition. In such a case, even when the output torque Tq of the tire driving electric motor 18 is calculated by the equation (10), there is a possibility that the torque is slightly in short. Therefore, depending on the type of the tire and the load (the vertical load), the output torque Tq of the tire driving electric motor 18 may be corrected by an equation (11) in the longitudinal force test.

$$Tq' = Tk \times Tq = Tk \times (Fx \pm Fx_0) \times TH \tag{11}$$

wherein
Tq': output torque of the tire driving electric motor after correction
Tk: a correction coefficient The correction coefficient shown in the equation (11) can be determined by an experiment so as to be a value of solving shortage of the torque.

According to the present invention, the working torque working on the simulated road surface driving electric motor 11 as the external force from the tire side when the braking force or the drive force is imposed on the tire driving electric motor 18 so as to rotate the tire is determined, and the torque corresponding to the external force is added to the output torque of the simulated road surface driving electric motor 11 as the feedforward component. Therefore, even when the output torque of the tire driving electric motor 18 is changed, the rotation number of the drive drum 10 (the simulated road surface moving speed) is hardly changed so as to be constant. In other words, in the longitudinal force test, even when the external force from the tire side is imposed on the side of the simulated road surface 2 of the drive drum 10 in accordance with the change in the output torque of the tire driving electric motor 18, it is possible to suppress the change in the simulated road surface moving speed as the working torque corresponding to the above external force is added to the simulated road surface driving electric motor 11.

It should be noted that the embodiments disclosed herein are examples in all terms and not limitation. For example, in the above embodiments, the tire testing machine in which a surface of a rotating drum is the simulated road surface is disclosed. However, the present invention may be applied to a tire testing machine in which a flat belt is wound around the rotating drum and a driven drum so that a surface of the flat belt is the simulated road surface.

A scope of the present invention is shown by not the above description but the claims, including similar meanings to the claims and all the variations within the claims.

What is claimed is:

1. A driving control method of a tire testing machine, the tire testing machine, including:
   a tire driving electric motor for rotating a tire via a tire shaft;
   a simulated road surface driving electric motor for moving a simulated road surface; and
   a controller for giving a rotation command to the tire driving electric motor so that a slippage ratio of the tire with respect to the movement of the simulated road surface is a preliminarily fixed value, and changing rotation speed of the tire, the method comprising:

estimating longitudinal force imposed on the tire in accordance with the slippage ratio of the tire in a case where the rotation command is given;

determining a torque limitation value for the tire driving electric motor based on an estimated longitudinal force estimate value; and applying the torque limitation value to torque limitation of the tire driving electric motor when the rotation command is given so as to change the rotation speed of the tire.

2. The driving control method of the tire testing machine according to claim 1, wherein the torque limitation value is determined by an equation (1):

[Torque limitation value]=[Longitudinal force estimate value]×[Tire running radius]   (1)

wherein

[Longitudinal force estimate value]=[Internal coefficient]×[Load]×[Slippage ratio]

wherein the tire running radius: a distance from the simulated road surface to a wheel center of the tire;

the internal coefficient: a coefficient differentiated by a testing condition; and the load: a vertical load of the tire to the simulated road surface.

3. The driving control method of the tire testing machine according to claim 1, further comprising:

when the rotation command is given and braking force or drive force is imposed on the tire driving electric motor so as to rotate the tire, determining torque working on to the simulated road surface driving electric motor as external force from the tire side; and adding the torque corresponding to the external force to output torque of the simulated road surface driving electric motor.

4. The driving control method of the tire testing machine according to claim 3, wherein the simulated road surface is provided so as to be moved by a drive drum driven by the simulated road surface driving electric motor, and the torque added to the simulated road surface driving electric motor is determined by equations (2) to (4):

$$Td = \frac{Tn}{TH} \times DR \quad (2)$$

$$Tdm = \frac{Td}{Gr} \quad (3)$$

$$FF = \alpha \times Tdm \quad (4)$$

wherein

Td: torque working on a rotation shaft of the drive drum by the braking force or drive force on the tire driving electric motor as the external force;

Tn: generated torque of the tire driving electric motor;

TH: the tire running radius;

DR: a distance determined by adding thickness of the simulated road surface to a rotation radius of the drive drum;

Tdm: torque working on a rotation shaft of the simulated road surface driving electric motor by the braking force or the drive force on the tire driving electric motor as the external force;

Gr: a gear reduction ratio of a reducer connected to the simulated road surface driving electric motor;

FF: the torque added to the simulated road surface driving electric motor; and

α: a correction coefficient.

5. A tire testing machine, comprising:

a tire driving electric motor for rotating a tire shaft;

a simulated road surface;

a simulated road surface driving electric motor for moving said simulated road surface; and a controller for giving a rotation command to said tire driving electric motor so that a slippage ratio of a tire with respect to movement of said simulated road surface is a preliminarily set target value, and changing rotation speed of the tire, the controller including:

a rotation command value calculating portion for determining the rotation command given to said tire driving electric motor so as to change the rotation speed of the tire in accordance with the slippage ratio;

a longitudinal force estimating portion for estimating longitudinal force imposed on the tire in a case where the rotation command is given;

a torque limitation value setting portion for setting a torque limitation value for said tire driving electric motor based on the estimated longitudinal force; and a torque limiting portion for applying the torque limitation value when the rotation command is given so as to change the rotation number of said tire driving electric motor and putting torque limitation on said tire driving electric motor.

6. The tire testing machine according to claim 5, wherein said controller further including:

a working torque calculating portion for determining torque working on to said simulated road surface driving electric motor as external force from the tire side in a case where the rotation command is given and braking force or drive force is imposed on said tire driving electric motor so as to rotate the tire; and a torque adding portion for adding the torque corresponding to the external force calculated by said working torque calculating portion to output torque of said simulated road surface driving electric motor.

* * * * *